United States Patent [19]

Teague

[11] 4,343,007

[45] Aug. 3, 1982

[54] MULTI-COLOR MULTI-POINT RECORDER

[75] Inventor: Robert H. Teague, Red Hill, Pa.

[73] Assignee: Honeywell Inc., Minneapolis, Minn.

[21] Appl. No.: 191,248

[22] Filed: Sep. 26, 1980

[51] Int. Cl.[3] .............................................. G01D 9/32

[52] U.S. Cl. .................................. 346/46; 346/139 B

[58] Field of Search ................. 346/46, 47, 62, 139 A, 346/139 B, 140 R, 141 R

[56] References Cited

U.S. PATENT DOCUMENTS

| | | | |
|---|---|---|---|
| 2,926,602 | 3/1960 | MacDonald et al. | 197/1 |
| 3,236,351 | 2/1966 | Fitch et al. | 197/1 |
| 3,857,470 | 12/1974 | Bastard et al. | 197/1 |
| 3,882,988 | 5/1975 | Sloan et al. | 197/66 |
| 4,172,258 | 10/1979 | Lane | 346/46 |
| 4,189,244 | 2/1980 | Harrison | 400/55 |

*Primary Examiner*—John Gonzales
*Attorney, Agent, or Firm*—Laurence J. Marhoefer; Lockwood D. Burton; Mitchell J. Halista

[57] ABSTRACT

A multi-point recorder has a multi-color ink cartridge arranged to be selectively aligned with a recording head having a plurality of selectively energizable recording elements whereby a color from the multi-color ink cartridge is selected for printing by the recording elements. The recorder can either be operated in a fixed color operation by maintaining a preselected alignment of the recording head and a desired color in the multi-color ink cartridge or the color of the recording can be selectively altered at any time to produce a multi-color recording by selecting a corresponding color from the multi-color ink cartridge and aligning the recording head therewith for each recording. A drive mechanism having a single drive motor for the ink cartridge and the recording head is used to align the ink cartridge with the recording head along a recording line on a recording medium and to position the recording head and the ink cartridge at a printing location on the recording line.

12 Claims, 5 Drawing Figures

MULTI-COLOR MULTI-POINT RECORDER

BACKGROUND OF THE INVENTION

1. Field of the Invention

The present invention relates to multi-point strip chart recorders. More specifically, the present invention is directed to a multi-point recorder for recording each of a plurality of input signals in respective ones of a plurality of colors.

2. Description of the Prior Art

Print mechanisms embodying record distinguishing means for i.e., multi-input, strip chart recorders have been known employed for many years. Such print mechanisms generally have operated in a single recording mode and have identified each recorded input quantity under measurement by a characteristic mark or color. Multi-point recorders of a multi-color type have previously employed ink wheels which contained ink pads with different respective colors arranged along the periphery of the ink wheel. A selected color is arranged to contact a desired mark on a print wheel before that mark is brought into printing contact with the record medium, e.g., U.S. Pat. Nos. 3,611,412 and 3,991,676. However, such prior art recorders used a peripherally segmented ink wheel where a rotation of the ink wheel was required before the desired color could be aligned with the printing mark. Further, the print mark on the print wheel was arranged to contact the ink wheel before contact was made between the print wheel and the recording medium. Such a printing mechanism required a complex drive system for achieving the required mechanical interactions. A prior art attempt to simplify the printing mechanism wherein a plurality of print hammers were arranged on one side of the recording medium along with a multi-color ink ribbon or band while the desired print characters were located on the other side of the recording medium on the moving belt is shown in U.S. Pat. 3,991,676. However this prior art recorder also involved a complex and expensive mechanical system including a print head mechanism having hammers arranged across the entire width of the recording medium which produced a basically uneconomical recording head structure. A more recent development to produce a multi-color multi-point recorder is shown in U.S. Pat. Nos. 4,172,258 and 4,210,917. While this recorder has the capability of multi-color multi-point recording, the drive mechanism for aligning and positioning the recording head and ink cartridge is complex and requires respective drive means including separate drive motors for moving the ink cartridge and the recording head.

SUMMARY OF THE INVENTION

An object of the present invention is to provide an improved multi-point recorder having multi-color capabilities which has a simple shared drive system for the recording head and ink cartridge.

Another object of the present invention is to provide an improved multi-color multi-point recorder having a single drive motor for providing alignment of the recording head and ink cartridge and movement of the recording head and ink cartridge across the recording medium along a recording line.

In accomplishing these and other objects, there has been provided, in accordance with the present invention, a multi-point recorder having a multi-color ink cartridge mounted on a first carriage linearly movable along a recording line on one side of the recording medium while the recording head employing a combination of selectively actuable recording elements is mounted on a second carriage located on the other side of the recording medium and linearly movable along the recording line. The ink cartridge and the recording head are each located on respective support guides and connected to a drive means for positioning the ink cartridge and recording head along a recording line along on the recording medium. The drive means has a single drive motor shared by the recording head and the ink cartridge for concurrently moving the recording head and the ink cartridge along the recording line and for separately moving the ink cartridge with respect to the recording head to select a recording ink color.

BRIEF DESCRIPTION OF THE DRAWINGS

A better understanding of the present invention may be had when the following detailed description is read with the accompanying drawings, in which.

DESCRIPTION OF THE PREFERRED EMBODIMENT

Figure 1:
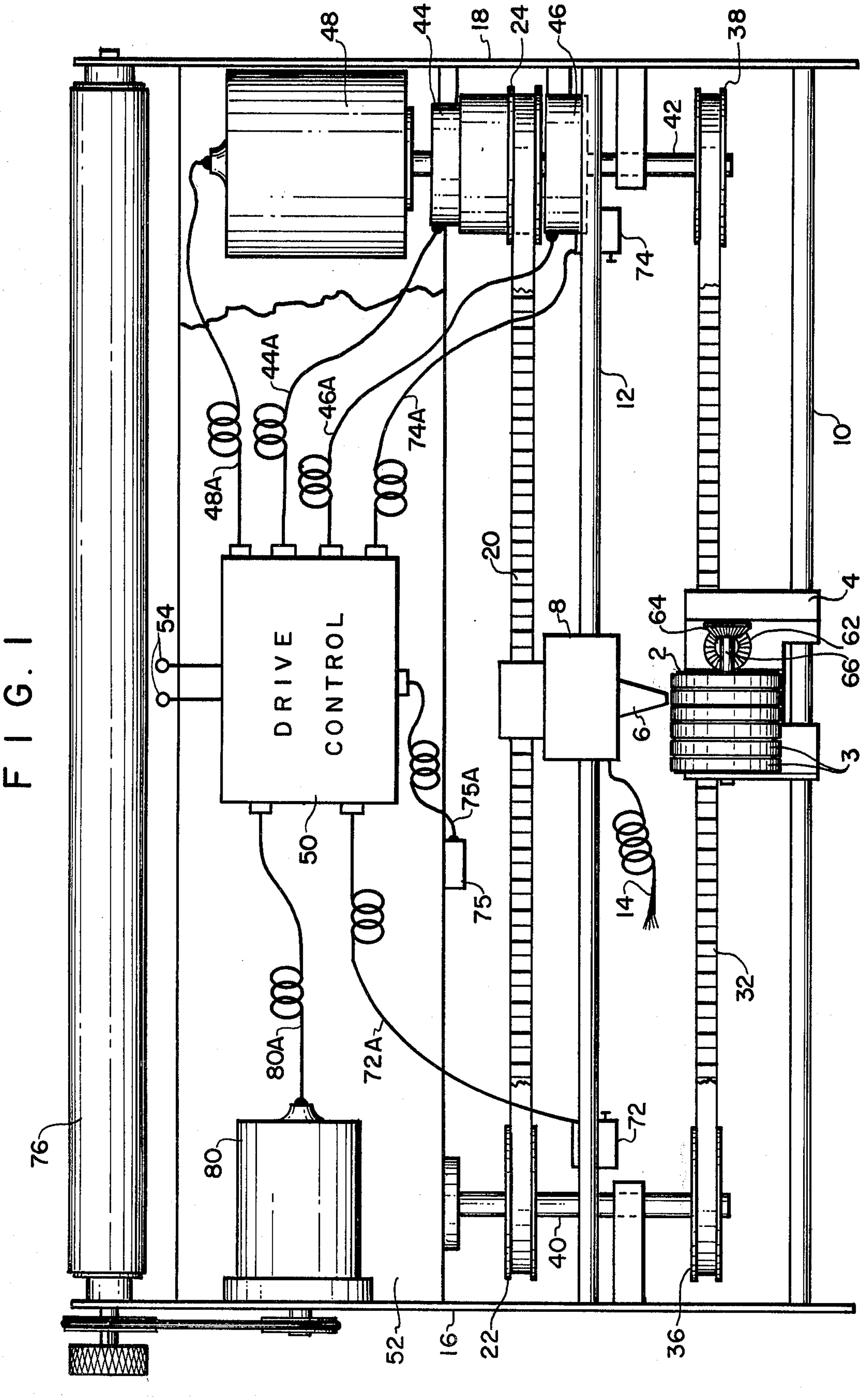
FIG. 1 is a pictorial illustration of a top view of a multi-point multi-color recorder embodying an example of the present invention.

In FIG. 1 there is shown a top view illustration of a multi-point multi-color recorder embodying an example of the present invention and using an ink cartridge or wheel 2 having a plurality of parallel and coaxial ink containing layers 3 arranged on an ink cartridge carriage 4 for movement along a recording medium (not shown) along a recording line as more-fully described hereinafter with respect to FIG. 4. A recording head 6 is located on a recording head carriage 8 which is also arranged to be driven across the recording medium along the recording line. The recording head 6 with the recording head carriage 8 and the ink cartridge 2 with the ink cartridge carriage 4 are located on opposite sides of the recording medium, e.g., the ink cartridge carriage 4 may be located on the side of the recording medium facing an operator while the recording head carriage 8 can be located on the hidden, or rear side, of the recording medium. The ink cartridge 4 is slidably supported on a guide rail 10 to enable the cartridge carriage 4 to be moved across the recording medium in a predetermined and linear fashion along a recording line. Similarly, the recording carriage 8 is slidably supported on a guide rail 12 whereby the recording carriage 8 may be similarly moved linearly in a predictable fashion along the recording line across the recording medium. The recording head 6 is connected by a multi-conductor cable 14 to any suitable means (not shown) for selectively energizing the recording pins in the recording head 6 to produce a desired recording on the recording medium. Such pin matrix recording heads are well-known in the art, e.g., the ballistic recording head manufactured by the Universal Micro-Printers Co. of Foster City, Calif., and a further discussion thereof is believed to be unnecessary for an understanding of its operation and construction.

The guide rails 10 and 12 are mounted between a pair of parallel end plates 16 and 18 which define the width of the recorder and provide support for the various elements of the recorder, as hereinafter described. The recording carriage 8 is connected to a first drive belt 20 which is selectively driven to move the recording head carriage 8 along the guide rail 12. The drive belt 20 is supported in a closed loop configuration by belt pulleys 22, 24 mounted on respective bearings (not shown). The ink cartridge carriage 4 is driven by a second drive belt 32 supported on a pair of pulleys 36 and 38 mounted on respective bearings (not shown). The drive belts 20, 32 are preferably toothed, or cog, belts and the pulleys 22, 24, 36, and 38 are of a suitable configuration to mesh with the belts 20, 32 to provide a positive non-slip drive operation. The cartridge 2 is arranged to contact the recording medium on the opposite side thereof from the recording head 6 whereby the selected energization of the printing elements of the recording head 6 to drive the recording medium into contact with a corresponding one of the ink containing layers 3 in the ink cartridge 4 previously aligned with the recording head 6 to produce a record mark on the recording medium. The ink cartridge 2, the ink supply layers 3 and the ink carriage 4 are more fully described herein with respect to FIG. 4.

The pulleys on one side of the recorder, e.g., pulleys 22 and 36, are rotatably mounted on respective bearings on a support shaft 40. The pulleys on the other side of the recorder, e.g., the pulleys 24 and 38, are mounted on a drive shaft 42. Specifically, the pulley 38 connected to the drive belt 32 is fixed to the drive shaft 42 by any suitable means, e.g., a set screw, while the pulley 24 is rotatably mounted by bearing means (not shown) on the drive shaft 42. Adjacent to the pulley 24 on respective sides thereof are a clutch apparatus 44 and a brake apparatus 46. The clutch apparatus 44 is arranged to be selectively energized by an energizing signal on line 44A to operatively connect the pulley 24 to the drive shaft 42 while the brake apparatus 46 is arranged to be selectively energized by an energizing signal on line 46A to prevent the pulley 24 from turning as a result of frictional forces exerted thereon by the movement of the drive shaft 42 turning within the bearing means supporting the pulley 24. A drive motor 48 is connected to the drive shaft 42 to produce a selective rotation thereof by an energizing signal applied on line 48A. The motor 48 may advantageously be a so-called stepping motor which is capable of producing incremental step motions of the drive shaft 42 in response to energizing pulses applied to the drive motor 48 on line 48A. The drive motor 48 is mounted on the side plate 18.

A drive control 50 is arranged to produce the aforesaid selective energization signals for the drive motor 48, the clutch apparatus 44 and the brake apparatus 46. The drive control means 50 is mounted on a shelf 52 extending between the side plates 16 and 18. The drive control means 50 may be any suitable prior art electrical signal control for selectively energizing the motor 48, the clutch 44 and the brake 46 in response to input signals applied to input terminals 54. Thus, the drive control means 50 is effective to drive the combination of the recording head carriage 8 and the ink cartridge carriage 4 across the recording medium in response to an input signal applied to input terminals 54 to position the recording head 6 at a point along the recording line on the recording medium at which a recording is desired and to selectively effect a reorientation of the recording head 6 and a desired one of the ink carrying layers 3 on the ink cartridge 2 to produce a desired color of the recording. The details of the drive control means 50 are conventional and a detailed discussion thereof is believed to be unnecessary in order to provide an understanding of the present invention. Thus, the drive control means 50 may include well-known circuits for counting the pulses applied to the drive motor 48 to maintain a record of the position of the recording head 6 and ink cartridge 2 in combination with the energizing signals applied to the clutch 44 and brake 46. This position is compared with an input signal to be recorded and is applied to the input terminals 54 whereby the amplitude of the input signal is recorded on the recording medium at a point represented by a transverse amplitude scale on the recording medium. Such a null-balance drive of the recording element along the recording medium is well-known in the art, e.g., a recorder as shown in U.S. Pat. Nos. 2,427,480 and 3,576,582. The input signal to the drive control means 54 could also include a control signal indicative of the need for a color change in the recording. This color change control signal would be used by the drive control means to selectively energize the clutch and brake apparatus 44 and 46 along with the drive motor 48 as hereinafter described.

Figure 2:
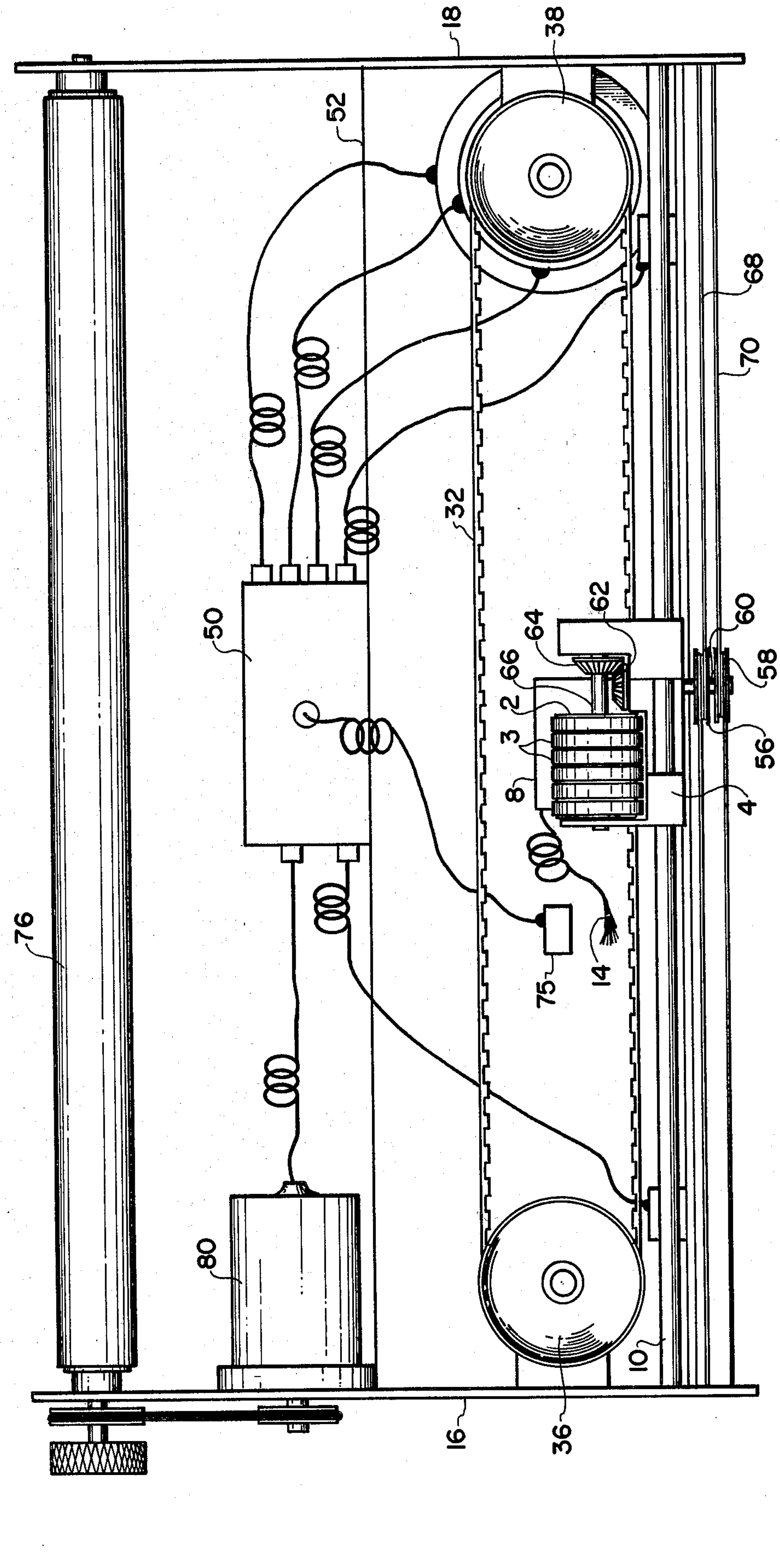
FIG. 2 is a pictorial illustration of a front view of the recorder shown in FIG. 1.

As shown in FIG. 2, a pair of cable pulleys 56 and 58 are coaxially mounted on the ink cartridge carriage 4 by means of a support shaft 60 and respective one-way clutches (not shown) located within each of the pulleys 56 and 58 to connect the pulleys 56 and 58 to one end of the shaft 60. Such clutches are well-known in the art such as the roller clutch manufactured by the Torrington Company, Torrington, Conn. The shaft 60 is arranged to pass through the ink cartridge carriage 4 to drive the first one of a pair of meshed bevel gears 62, 64. The bevel gears 62, 64 change the drive direction from the axis of the shaft 60 connected to a first bevel gear 62 to the axis of a shaft 66 connected to a second bevel gear 64 and located at a 90 angle with respect to the axis of the shaft 60. The ink cartridge 2 is attached to the shaft 66 and is arranged to rotate therewith. The rotation of the shaft 60 is produced by a rotation of the pulleys 56 and 58 which are connected to cables 68 and 70, respectively. Specifically, each of the cables 68 and 70 is wrapped around a corresponding pulley and has its ends fastened to to a respective one of the side plates 16, 18. For example, cable 68 is wrapped on pulley 56 and fastened to end plate 16 while cable 70 is wrapped on pulley 58 and fastened to end plate 18. The cables 68, 70 are wrapped around their respective pulleys in opposite directions whereby a movement of the ink carriage 4 produced by the drive belt 32 is effective to unwrap one of the cables 68, 70 while wrapping up the other one of the cables 68, 70.

Figure 5:
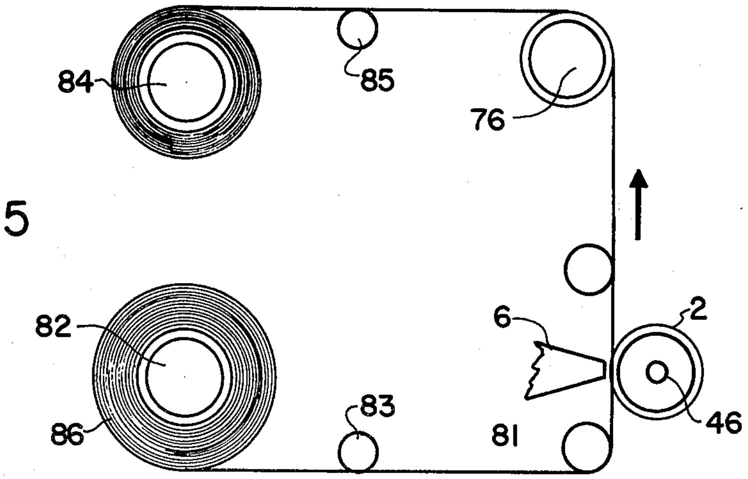
FIG. 5 is a diagramatic illustration of the recording medium path in the recorder shown in FIG. 1.

A plurality of recording medium support rollers, e.g., rollers 76 and 78, are also supported between the end plates 16 and 18 to define a recording medium path as shown in FIG. 5. A recording medium drive includes a drive motor 80 mounted on the shelf 52 and arranged to drive support roller 76 and a recording medium supply reel 82 and take-up reel 84 by any suitable belts or cables (not shown). The drive motor 80A is driven by energizing signals applied over line 80A from the drive control 50. A roll of the recording medium 86 is shown supported on the reel 82 while the detailed showing of the path taken by the recording medium 94 is shown in FIG. 5 for the purpose of illustrating a specific recording medium path between the tape reels 82 and 84 and the passage of the recording medium between the recording head 6 and the ink cartridge 2.

Figure 3:
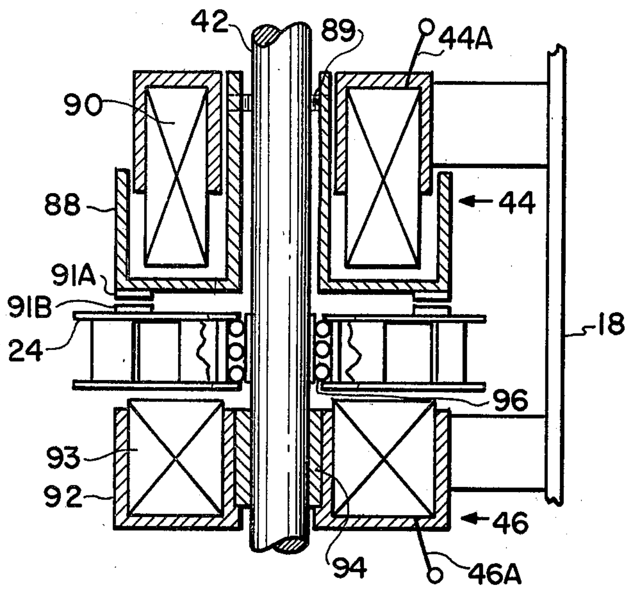
FIG. 3 is a detailed cross-sectional illustration of the brake-clutch apparatus used in the recorder shown in FIGS. 1 and 2.

In FIG. 3, there is shown a detailed cross-sectional representation of the clutch and brake apparatus 44, 46. The clutch apparatus 44 includes a hollow annular housing 88 encircling the drive shaft 42 and attached thereto by any suitable means, e.g., set screw 89. The annular housing 88 has an open end for admitting an electromagnetic energization coil in the form of an annular ring 90. The energization coil 90 is fixed to any suitable mount, e.g., the end plate 18. The coil 90 is spaced from the interior walls of the annular housing 88 to permit rotation of the housing 88 with the drive shaft 42. The housing 88 is spaced from the pulley 24 and has a plurality of drive teeth 91A facing a similar plurality of drive teeth 91B on the pulley 24. The drive teeth 91A and 91B are provided for effecting a positive drive of the pulley 24 by the housing 44 and to provide discrete repeatable positioning of the pulley 24. On the other side of the pulley 24 is located a second annular housing 92 which is arranged to enclose an energizing coil 93 therein. The second housing 92 is fixed to any suitable means, e.g., the side plate 18 to prevent rotation thereof while allowing the drive shaft 42 to pass through a central opening in the annular housing 92. Bearing means 94 are provided between the shaft 42 and the annular housing 92 to allow the shaft 42 to rotate independently of the annular housing 92. The pulley 24 is also provided with a bearing means 96 for enabling the pulley to rotate on the shaft 42 while enabling a transverse motion or movement of the pulley 24 on the shaft 42 to be induced therein by either the clutch 44 or the brake 46. Thus, the pulley bearing means 96 may be any suitable type of bearing, e.g., a sleeve bearing or a ball bearing, capable of allowing a rotation and a transverse movement.

Figure 4:
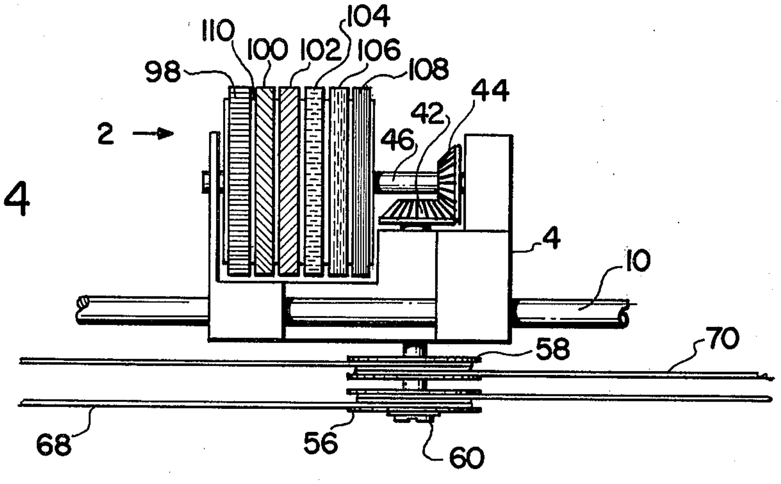
FIG. 4 is a pictorial illustration of the detail of an ink cartridge suitable for use with the recorder shown in FIG. 1.

In FIG. 4, there is shown a detailed representation of the ink cartridge 2 which is mounted on the ink cartridge carriage 4 for linear movement therewith along guide rail 10 and for rotation on the shaft 46 in response to the differential operation of the pulleys 56 and 58 by means of the one-way clutches previously described. The ink cartridge 2 includes a plurality of concentric ink filled layers 98, 100, 102, 104, 106 and 108. These ink filled layers may contain respective color of recording ink. The recording layers 100, etc. are separated from each other by ink impervious spacers or washers, e.g., the ink layer 98 is separated from ink layer 100 by spacer 110. Thus, the spacers are effective to prevent migration of ink from one ink layer to another. These spacers may be made of aluminum while the ink layers may be of any suitable ink retaining material in a washer shaped configuration, e.g., the microporous material identified as Day-Flo No. 175 manufactured by the Dayco Corporation of Dayton, Ohio.

The spacers and ink layers are attached together by any suitable means, e.g., rivets, and are attached to the shaft 46 to be rotated therewith. Thus, the rotation of the ink cartridge 2 by the shaft 46 is effective to spread the wear and ink utilization of the printing operation around the entire periphery of each of the ink layers 100, etc. Additionally, by having the belts 20 and 32 and their respective pulleys provided with differing numbers of belt grooves and pulley teeth, the ink cartridge carriage 4 and the recording head carriage 8 would be driven at slightly different speeds across the recording line to transversely distribute the contact of the recording head 6 across the ink layers 100, etc. The shaft 46 is rotated by the bevel gears 42, 44 which, in turn, are driven by the shaft 60 and pulleys 56 and 58. Since the pulleys 56 and 58 have one-way clutches therein arranged for opposite clutching operation, only one of the pulleys 56, 58 is effective to drive the shaft 60 at any time since the pulleys 56 and 58 are always rotated in opposite directions by the drive cables 68, 70. However, the shaft 60 and the ink cartridge are always driven in the same directions since the one-way clutches convert the opposite motion of the pulleys 56 and 58 to a single direction rotation of the shaft 60.

MODE OF OPERATION

In operation, the recorder apparatus of the present invention is effective to concurrently drive the recording head 6 and the color cartridge 2 across a recording medium along the recording line to produce a recording thereon. Additionally, the recording medium is driven between a supply reel and a take-up reel by a recording medium drive system. Further, the orientation of the recording head 6 with the ink layers 100, etc. in the color cartridge 2 is selectively alterable to change the color of the recorded mark on the recording medium.

Specifically, the recording medium drive motor 80 is energized by the drive control means 50 to drive the recording medium past the recording head 6 and the ink cartridge 2 as shown in FIG. 5. Assuming that a single color is to be used for the recording, the recording head 6 is oriented with a desired ink layer in the ink cartridge by a selective energization of the drive motor 48 and the brake 46. The energization of the brake 46 is effective to transversely displace the pulley 24 along the shaft 42 into contact with the brake 46 to prevent rotation of the pulley 24 and to retain the recording head carriage 8 in a predetermined position. The transverse motion of the pulley 24 is accommodated by the bearing means supporting the pulley 24 and by a slight skewing of the belt 20. The rotation of the shaft 42, on the other hand, is transmitted to the pulley 38 and is effective to move the ink cartridge carriage 4 along the guide rail 10. This energization of the drive motor 48 is continued until the drive control means 50 has detected that the desired color orientation has been achieved. When the desired ink layer 3 on the ink cartridge 2 has been selected, the energization of the drive motor 48 is terminated.

A selection of the position for the recording on the recording medium is achieved by an energization of the drive motor 48 and the clutch 44 with a concurrent deenergization of the brake 46. The energization of the clutch 44 is effective to transversely displace the pulley 24 against the clutch 44 to mesh the drive teeth 91A and 91B whereby a positive drive of the pulley 24 by the clutch shaft 42 is now possible. Further, the clutching action of the clutch 44 retains the previously selected orientation of the recording head 6 and an ink layer in the ink cartridge 2. The drive motor 48 is now energized by the drive control means 50 to drive the drive shaft 42 which is effective to concurrently rotate both the pulley 24 and the pulley 38 for a concurrent movement of the recording head carriage 8 and the ink cartridge 4 across the recording medium along the recording line. This motion is continued until a desired recording position is attained as controlled by the drive control 50.

It should be noted that during either the color selection operation or the recording operation, the rotation of the pulleys 56 and 58 is effective to rotate the ink cartridge 2 to distribute the recording wear on the ink layers, as previously discussed. Such a rotation also allows the ink flow to provide replenishment of the ink at the surface of each ink layer. Additionally, since such a matrix recording head is capable of multi-character recording, the recorder may use a bi-directional recording medium drive producing either real-time or historical displays of graphs, charts, block diagrams, etc. Further, while the illustrative example of the invention shown herein uses a null-balance recording technique, other recording techniques such as a scan, or on-the-fly, recording wherein the recording head is simply driven across the recording medium and a recording is effected at the appropriate place, may be used without departing from the scope of the present invention. Additionally, a pair of over travel detectors 72, 74 may be positioned along the guide rail 12 to detect the attainment of an end of record line position by the recording head carriage 8. The signals from the detectors 72 and 74 are applied over signal lines *72a, 74a*, respectively, to the drive control 50 to signal the position of the recording carriage 8 at the over travel position along the recording line. The detectors 72 and 74 may be any suitable detectors operating on well-known principles including optical, magnetic, etc., such devices being well-known in the art. Finally, an additional detector element 75 may be positioned along the recording line to detect a predetemined position of the recording carriage 8 whereby an output signal from the detector 75 can be used as a reference signal for the drive control 50 to periodically resynchronize its counting operation.

Accordingly, it may be seen that there has been provided, in accordance with the present invention a multipoint recorder having multi-color capabilities with a shared single motor recording head and recording ink cartridge drive system.

The embodiments of the invention in which an exclusive property or privilege is claimed are defined as follows:

1. A recording mechanism for a multi-point recorder having a recording medium comprising a first carriage means linearly movable with respect to a recording line on said recording medium, a recording head means mounted on said first carriage means, a second carriage means linearly movable with respect to said recording line on said recording medium and located on the other side of said recording medium from said first carriage means, a multi-color ink cartridge means mounted on said second carriage means and drive means having a single drive motor for concurrently moving said first carriage means and said second carriage means across said recording medium and for separately moving said second carriage means with respect to said first carriage means to provide a selective orientation of said print head means and said ink cartridge means to select a recording ink color.

2. A multi-point recorder as set forth in claim 1 wherein said drive means further includes a drive shaft connecting said drive motor to said second carriage means and a clutch means connecting said drive shaft to said first carriage means.

3. A multi-point recorder as set forth in claim 1 and further including a first guide bar means for supporting said first carriage means while allowing said linear movement thereof and second guide bar means for supporting said second carriage means while allowing said linear movement thereof.

4. A multi-point recorder as set forth in claim 1 and further including recording medium drive means for selectively transporting a recording medium between said recording head and said ink cartridge.

5. A multi-point recorder as set forth in claim 1 wherein said ink cartridge means includes a plurality of ink containing layers separated by ink impervious layers and a shaft for coaxially mounting said ink containing layers and ink impervious layers on an axis parallel to said recording line.

6. A multi-point recorder as set forth in claim 5 and including means for rotating said shaft for coaxially mounting during movement of said second carriage means.

7. A multi-point recorder as set forth in claim 1 wherein said drive motor is a stepping motor and said drive means includes means for selectively supplying energizing pulses to said drive motor.

8. A multi-point recorder as set forth in claim 2 wherein said drive means further includes a brake means for selectively braking said first carriage means.

9. A multi-point recorder as set forth in claim 1 wherein said first carriage means includes a first drive belt means and a first and second pulley means for supporting said belt means in a closed loop configuration and said second carriage means includes a third and a fourth support pulley and a second drive belt means supported on said third and fourth pulleys and arranged in a closed loop configuration, said drive means including first means continuously connecting one of said third and fourth pulleys to said drive motor and second means selectively connecting one of said first and second pulleys to said drive motor.

10. A multi-point recorder as set forth in claim 9 wheren said drive means further includes a drive shaft and said first means connects said second carriage to said drive shaft and said second means includes a clutch means, connecting said first carriage means to said drive shaft.

11. A multi-point recorder as set forth in claim 1 wherein said drive means includes a motor output shaft driven by said drive motor, means continuously connecting said drive shaft to said second carriage means and a clutch means for selectively connecting said output shaft to said first carriage means.

12. A multi-point recorder as set forth in claim 11 wherein said drive means further includes a brake means for selectively braking said first carriage means while allowing said drive means to drive said second carriage means.

* * * * *